(12) United States Patent
Putman et al.

(10) Patent No.: US 12,462,412 B2
(45) Date of Patent: **\*Nov. 4, 2025**

(54) DEEP PHOTOMETRIC LEARNING (DPL) SYSTEMS, APPARATUS AND METHODS

(71) Applicant: Nanotronics Imaging, Inc., Cuyahoga Falls, OH (US)

(72) Inventors: Matthew C. Putman, Brooklyn, NY (US); Vadim Pinskiy, Wayne, NJ (US); Tanaporn Na Narong, Palo Alto, CA (US); Denis Sharoukhov, Brooklyn, NY (US); Tonislav Ivanov, Brooklyn, NY (US)

(73) Assignee: Nanotronics Imaging, Inc., Cuyahoga Falls, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,940

(22) Filed: Feb. 6, 2023

(65) Prior Publication Data

US 2023/0186502 A1 Jun. 15, 2023

Related U.S. Application Data

(63) Continuation of application No. 17/166,976, filed on Feb. 3, 2021, now Pat. No. 11,574,413.

(51) Int. Cl.
*G06T 7/586* (2017.01)
*G02B 21/36* (2006.01)
(Continued)

(52) U.S. Cl.
CPC ............ *G06T 7/586* (2017.01); *G02B 21/367* (2013.01); *G06N 3/04* (2013.01); *G06N 3/08* (2013.01);
(Continued)

(58) Field of Classification Search
CPC .......... G06T 7/586; G06T 2207/10056; G06T 2207/10152; G06T 2207/20081;
(Continued)

(56) References Cited

U.S. PATENT DOCUMENTS 9,098,931 B2 8/2015 Shpunt et al.
10,169,852 B1 * 1/2019 Putman ............... G06F 18/2413
(Continued)

FOREIGN PATENT DOCUMENTS

CN 110060212 A 7/2019
CN 112381770 2/2021
(Continued)

OTHER PUBLICATIONS

Chen et al. "Self-Calibrating Deep Photometric Stereo Networks" (Included in IDS) (Year: 2019).*
(Continued)

*Primary Examiner* — James T Boylan
(74) *Attorney, Agent, or Firm* — DLA Piper LLP (US)

(57) ABSTRACT

An imaging system is disclosed herein. The imaging system includes an imaging apparatus and a computing system. The imaging apparatus includes a plurality of light sources positioned at a plurality of positions and a plurality of angles relative to a stage configured to support a specimen. The imaging apparatus is configured to capture a plurality of images of a surface of the specimen. The computing system in communication with the imaging apparatus. The computing system configured to generate a 3D-reconstruction of the surface of the specimen by receiving, from the imaging apparatus, the plurality of images of the surface of the specimen, generating, by the imaging apparatus via a deep learning model, a height map of the surface of the specimen based on the plurality of images, and outputting a 3D-re-
(Continued)

construction of the surface of the specimen based on the height map generated by the deep learning model.

14 Claims, 7 Drawing Sheets

Related U.S. Application Data

(60) Provisional application No. 62/969,574, filed on Feb. 3, 2020.

(51) Int. Cl.
*G06N 3/04* (2023.01)
*G06N 3/08* (2023.01)
*H04N 23/56* (2023.01)

(52) U.S. Cl.
CPC ... *H04N 23/56* (2023.01); *G06T 2207/10056* (2013.01); *G06T 2207/10152* (2013.01); *G06T 2207/20081* (2013.01); *G06T 2207/20084* (2013.01)

(58) Field of Classification Search
CPC ........ G06T 2207/20084; G02B 21/367; G06N 3/04; G06N 3/08; H04N 5/2256
See application file for complete search history.

(56) References Cited

U.S. PATENT DOCUMENTS

| | | |
|---|---|---|
| 2012/0257046 A1 | 10/2012 | Mueller et al. |
| 2015/0374210 A1* | 12/2015 | Durr ................ A61B 1/000095 600/111 |
| 2017/0191946 A1 | 7/2017 | Smith et al. |
| 2019/0005357 A1 | 1/2019 | Bhaviripudi et al. |
| 2019/0088004 A1 | 3/2019 | Lucas et al. |
| 2019/0104980 A1 | 4/2019 | Farooq et al. |
| 2021/0006681 A1* | 1/2021 | Colagrande .......... H04N 13/254 |
| 2021/0201526 A1* | 7/2021 | Moloney ................ G06N 3/082 |
| 2022/0051471 A1 | 2/2022 | Logothetis et al. |
| 2022/0189806 A1 | 6/2022 | Agashe et al. |

FOREIGN PATENT DOCUMENTS

| | | |
|---|---|---|
| JP | 2017-532561 | 11/2014 |
| JP | 2019-139694 | 8/2019 |

OTHER PUBLICATIONS

Chen, et al., "Self-calibrating deep photometric stereo networks," Proceedings of the IEEE/CVF Conference on Computer Vision and Pattern Recognition, 2019, pp. 8739-8747.
PCT International Application No. PCT/US21/16474, International Search Report and Written Opinion of the International Searching Authority, dated Apr. 26, 2021, 10 pages.
Ikehata, "CNN-PS: CNN-based photometric stereo for general non-convex surfaces," Proceedings of the European conference on computer vision (ECCV), 2018.
Malekmohamadi, "Deep learning based photometric stereo from many images and under unknown illumination," 2018 IEEE Symposium Series on Computational Intelligence (SSCI), IEEE, 2018.
Song, et al., "Photometric stereo using CNN-based feature-merging network," 2020 20th International Conference on Control, Automation and Systems (ICCAS), IEEE, 2020.
Office Action for Chinese Patent Application No. 202180012365.4, mailed Oct. 22, 2024, 5 Pages.
Office Action for Japanese Patent Application No. 2022546545, mailed Jun. 6, 2024, 7 Pages.
Office Action for JP Patent Application No. 2022-546545, mailed Nov. 2, 2023, 8 pages.
Extended Search Report for EP Patent Application No. 21751448.8, mailed Feb. 2, 2024, 9 Pages.
Taniai, et al., "Neural inverse rendering for general reflectance photometric stereo," International Conference on Machine Learning, PMLR, 2018, 30 pages.
Lionel, et al., "Modeling, measuring, and using BRDFs: significant French contributions," JOSA A 36.11, 2019, C40-C50, 12 pages.
First Examination Report for Indian Patent Application No. 202217042134, dated Feb. 3, 2023, 6 Pages.
International Preliminary Report on Patentability for International Application No. PCT/US2021/016474, mailed Aug. 18, 2022, 09 Pages.
Office Action for Korean Patent Application No. 10-2022-7030067, mailed Apr. 22, 2025, 4 Pages.

* cited by examiner

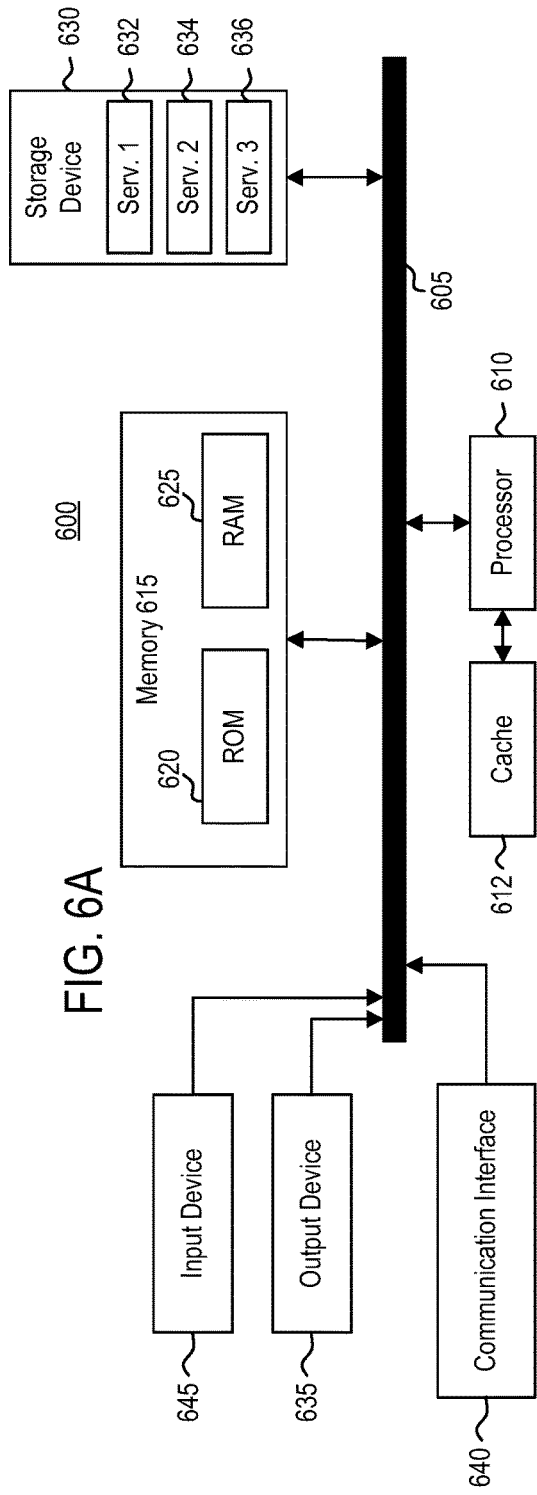
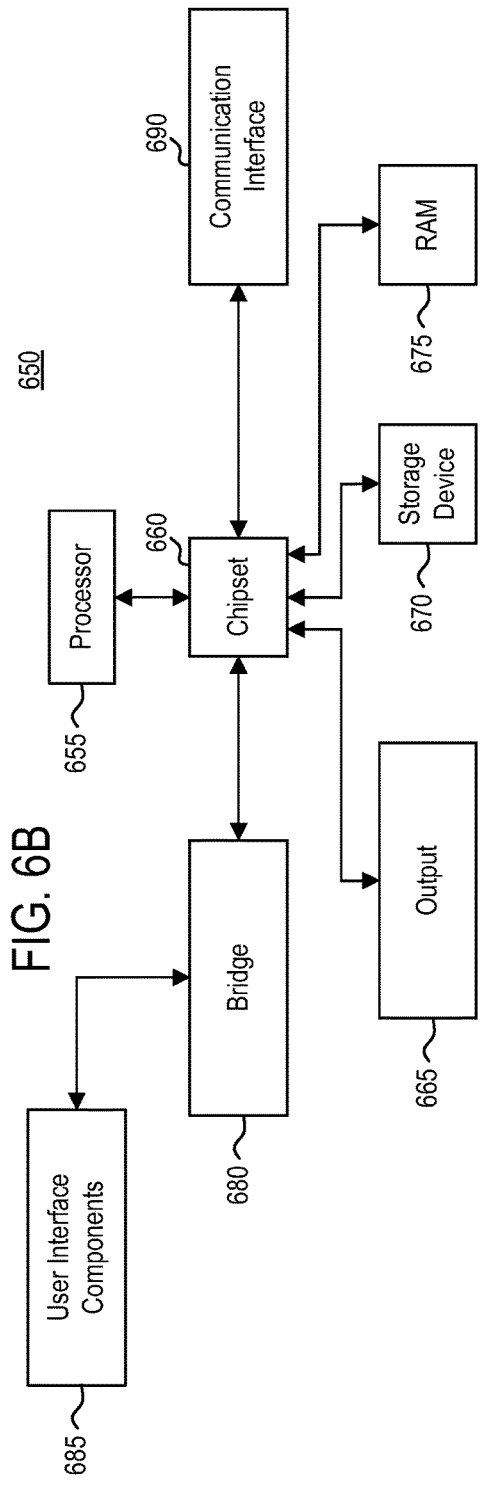

DEEP PHOTOMETRIC LEARNING (DPL) SYSTEMS, APPARATUS AND METHODS

CROSS-REFERENCE TO RELATED APPLICATIONS

This is a continuation of U.S. patent application Ser. No. 17/166,976, filed Feb. 3, 2021, which claims priority to U.S. Provisional Application Ser. No. 62/969,574, filed Feb. 3, 2020, which are incorporated by reference in their entireties.

FIELD OF DISCLOSURE

The present disclosure generally relates to an imaging system and, more particularly, to generating a 3D-reconstruction of a surface of a specimen captured by the imaging system.

BACKGROUND

Photometric stereo techniques can be used in computer vision to estimate depth and surface orientation based on Lambertian reflection of light. Surface normal and reflectance map of an object may be computed from input images taken using a fixed viewing angle with different illumination directions.

SUMMARY

In some embodiments, an imaging system is disclosed herein. The imaging system includes an imaging apparatus and a computing system. The imaging apparatus includes a plurality of light sources positioned at a plurality of positions and a plurality of angles relative to a stage configured to support a specimen. The imaging apparatus is configured to capture a plurality of images of a surface of the specimen. The computing system can be in communication with the imaging apparatus. The computing system can be configured to generate a 3D-reconstruction of the surface of the specimen by receiving, from the imaging apparatus, the plurality of images of the surface of the specimen, generating, by the imaging apparatus via a deep learning model, a height map of the surface of the specimen based on the plurality of images, and outputting a 3D-reconstruction of the surface of the specimen based on the height map generated by the deep learning model.

In some embodiments, a method of generating a 3D-reconstruction of a surface of a specimen is disclosed herein. A computing system receives, from an imaging apparatus, a plurality of images of a surface of a specimen positioned on a stage of the imaging apparatus. The computing system generates, via a deep learning model, a height map of the surface of the specimen based on the plurality of images. The computing system outputs a 3D-reconstruction of the surface of the specimen based on the height map generated by the deep learning model.

In some embodiments, a non-transitory computer readable medium is disclosed herein. The non-transitory computer readable medium includes one or more sequences of instructions, which, when executed by one or more processors, cause a computing system to perform operations. The operations include receiving, by the computing system from an imaging apparatus, a plurality of images of a surface of a specimen positioned on a stage of the imaging apparatus. The operations further include generating, by the computing system via a deep learning model, a height map of the surface of the specimen based on the plurality of images. The operations further include outputting, by the computing system, a 3D-reconstruction of the surface of the specimen based on the height map generated by the deep learning model.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 6A illustrates a system bus computing system architecture, according to example embodiments.

FIG. 6B illustrates a computer system having a chipset architecture, according to example embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Photometric stereo may be one technique for 3D reconstruction that may be performed by calculating the surface normal of an object from different illumination angles. The technique may be effective to estimate a height profile of static objects with large features, but often fails for objects with smaller features or in flat environments with small depressions, such as in semiconductor wafers. One or more techniques described herein provides an improvement over conventional 3D reconstruction techniques using photometric stereo. For example, one or more techniques described herein may include compound methods of using neural networks, along with advancements in surface normal calculation, to compensate for expected noise. The one or more techniques include several methods of incorporating sample noise and uneven sample illumination in the photometric stereo model. In some embodiments, the proposed model discussed below may demonstrate decreased noise susceptibility on synthetic and experimental data sets. Such approach may enable rapid inspection and reconstruction of complex surfaces without the need to use destructive or expensive analysis methods.

Generally, most applications of photometric stereo for depth estimation have been for macro-scale objects.

Recently, microscopic stereo methods, which calculate albedo, surface normal, and height maps by regularized minimization approach, have been used for depth estimation. The use of microscopic input images, however, imposed challenges in 3D-reconstruction due to the size of the features and near-field lighting conditions in case light emitting diode (LED) lamps or other light sources were set up in proximity to an imaging stage. These surface and lighting conditions may limit the performance of classic photometric stereo on microscopic surfaces.

The one or more techniques described herein utilize deep photometric learning models for 3D-reconstruction of microscopic surfaces using convolutional neural networks, instead of the entropy minimization framework of microscopic photometric stereo methods. For example, one or more techniques described herein may include training deep learning modules using synthetic and experimental inputs to compare deep photometric learning performance with the classical photometric stereo implementation. On synthetic data, for example, non-ideal surface and lighting conditions may be simulated by incorporating uneven illumination profiles, Gaussian noise and surface tilt in synthetic input images, and analyzed the robustness of both deep photometric learning and photometric stereo approaches to these conditions. Such use of deep learning techniques may reduce system reliance on Lambertian surfaces.

Figure 1:
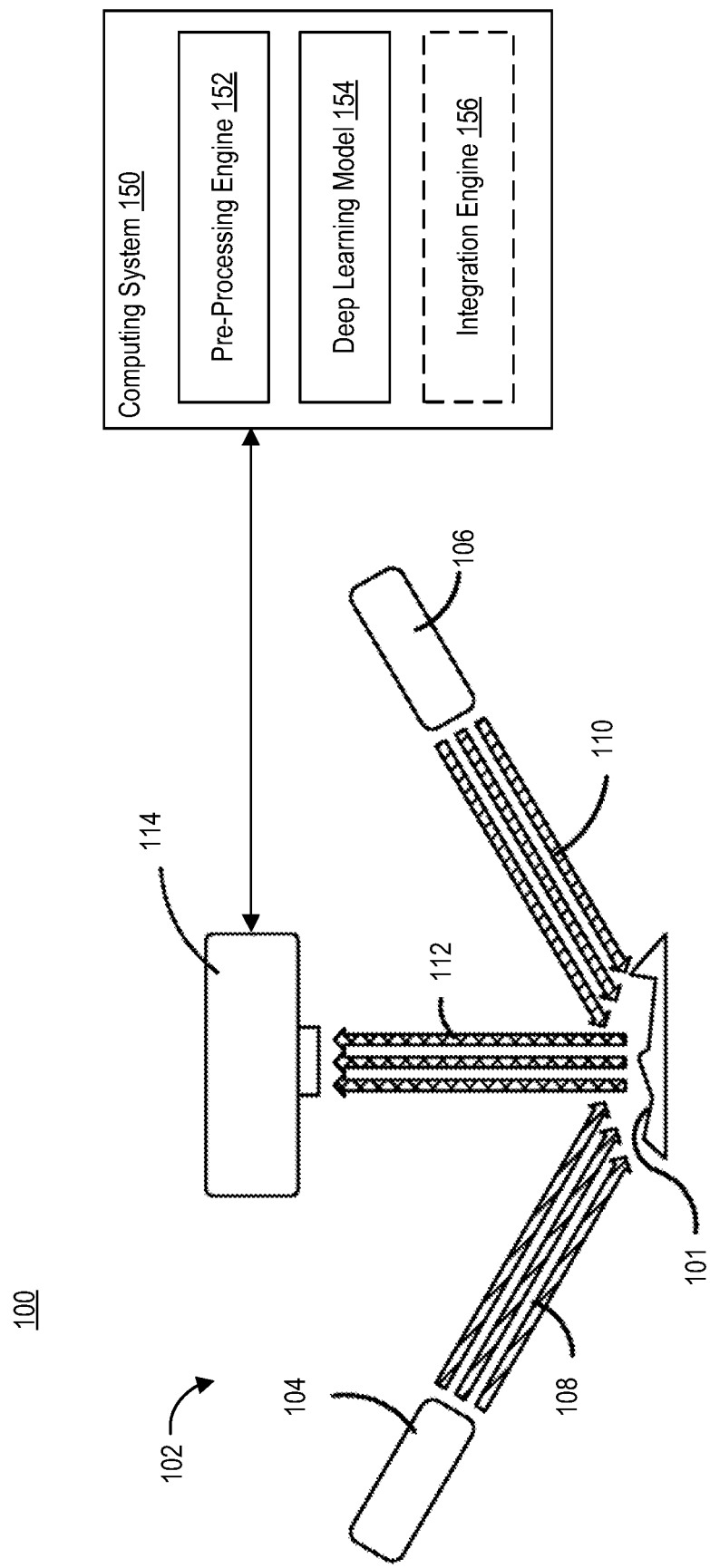
FIG. 1 is a block diagram illustrating a imaging system, according to example embodiments.

FIG. 1 illustrates an exemplary computing environment 100 for oblique illumination of a specimen and 3D reconstruction of a surface of a specimen supported on a stage, according to exemplary embodiments. As shown, computing environment 100 may include an apparatus 102 in communication with a computing system 150, according to example embodiments. Apparatus 102 may be configured to illuminate a specimen 101 with one or more light sources 104, 106. One or more light sources 104, 106 may be configured to direct oblique light 108, 110 toward specimen 101 at an angle. The oblique illumination may be reflected from a surface of specimen 101 as reflected light 112. Apparatus 102 may include a camera device 114 having an image sensor that is configured to capture the reflected light. In some embodiments, light sources 104, 106 may be moved to different positions located circumferentially around the object, with images taken at each position.

In some embodiments, apparatus 102 may provide the images captured by camera device 114 to computing system 150 for processing. Computing system 150 may be in communication with apparatus 102 via one or more communication channels. In some embodiments, the one or more communication channels may be representative of individual connections via the Internet, such as cellular or Wi-Fi networks. In some embodiments, the one or more communication channels may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Computing system 150 may be configured to analyze the images captured by camera device 114 and generate a topography of specimen 101.

As shown, computing system 150 may include a pre-processing engine 152 and a deep learning model 154. Each of pre-processing engine 152 and deep learning model 154 may include one or more software modules. The one or more software modules may be collections of code or instructions stored on a media (e.g., memory of computing system 150) that represent a series of machine instructions (e.g., program code) that implements one or more algorithmic steps. Such machine instructions may be the actual computer code the processor interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Deep learning model 154 may be configured to generate a 3D-reconstruction of a specimen. In some embodiments, deep learning model 154 may be trained using one or more synthetic training data sets. To create the synthetic data sets, pre-processing engine 152 may create one or more synthetic height maps by randomly placing a plurality (e.g., 100) non-overlapping half-spheres on a blank height map. In some embodiments, half-spheres with radius uniformly ranging from between about four to about twenty pixels may be added as bumps in the positive direction and holes in the negative direction (e.g., or vice versa) with height represented as a 32 bit pixel value. In some embodiments, pre-processing engine 152 may further convert each height map procedurally to a 3D shape using one or more modeling and rendering packages. In some embodiments, pre-processing engine 152 may calculate a position of a "point" light source for a plurality of illumination light vectors (e.g., eight illumination light vectors). For each light vector, a monochrome 16-bit image may be rendered using a ray-tracing engine (e.g., Cycles ray-tracing engine).

In some embodiments, deep learning model 154 may implement a convolutional neural network (CNN). In some embodiments, the CNN model may be similar to the U-Net model in PyTorch. In some embodiments, deep learning model 154 may be trained with three types of synthetic training data sets: a first training data set without noise and without tilt (e.g., "DPL"), a second training set with a fixed amount of Gaussian noise but without tilt (e.g., "DPLn"), and a third training set without noise but with tilt (e.g., DPLt). In some embodiments, each data set contained about 500 training examples. Deep learning model's 154 performance may be quantified on test data sets of various sizes. For example, the test data sets may include size 10 for DPL and DPLn (increasing the amount of Gaussian noise that may be added to the input images of the initial data set) and size 50 for DPLt.

In some embodiments, deep learning model 154 may be modified to include tilt angles as an additional input for the training examples with tilt. In some embodiments, for validation on experimental data, deep learning model 154 may be retrained using a data set of a plurality of training examples, which had a better matching illumination profile, and may be generated specifically to match experimental light vectors.

In some embodiments, computing system 150 may further include integration engine 156. While deep learning model 154 may be configured to predict a final height map directly, in some embodiments, deep learning model 154 may be used to predict a local surface of a specimen. Following prediction of the local surface of the specimen, integration engine 156 may be configured to generate a height map using the local surface prediction. For example, integration engine 156 may be configured to integrate the surface normal of the 3D-reconstruction to generate the height map. Generally, a gradient map g=[p, q] may be computed from a normal map $[n_x, n_y, n_z]$. In some embodiments, the equation $\nabla z(x, y) = g$ may be solved by minimizing this functional'

$$\mathcal{F}_{L2} = \iint \|\nabla z(x, y) - g\|^2 dx dy$$

In some embodiments, Euler-Langrage equation may require that p and q satisfy the Poisson equation:

$$\nabla^2 z = \partial_x p + \partial_y q$$

In some embodiments, integration engine 156 may use various techniques to solve the Poisson equation to compute a height map.

Figure 2:
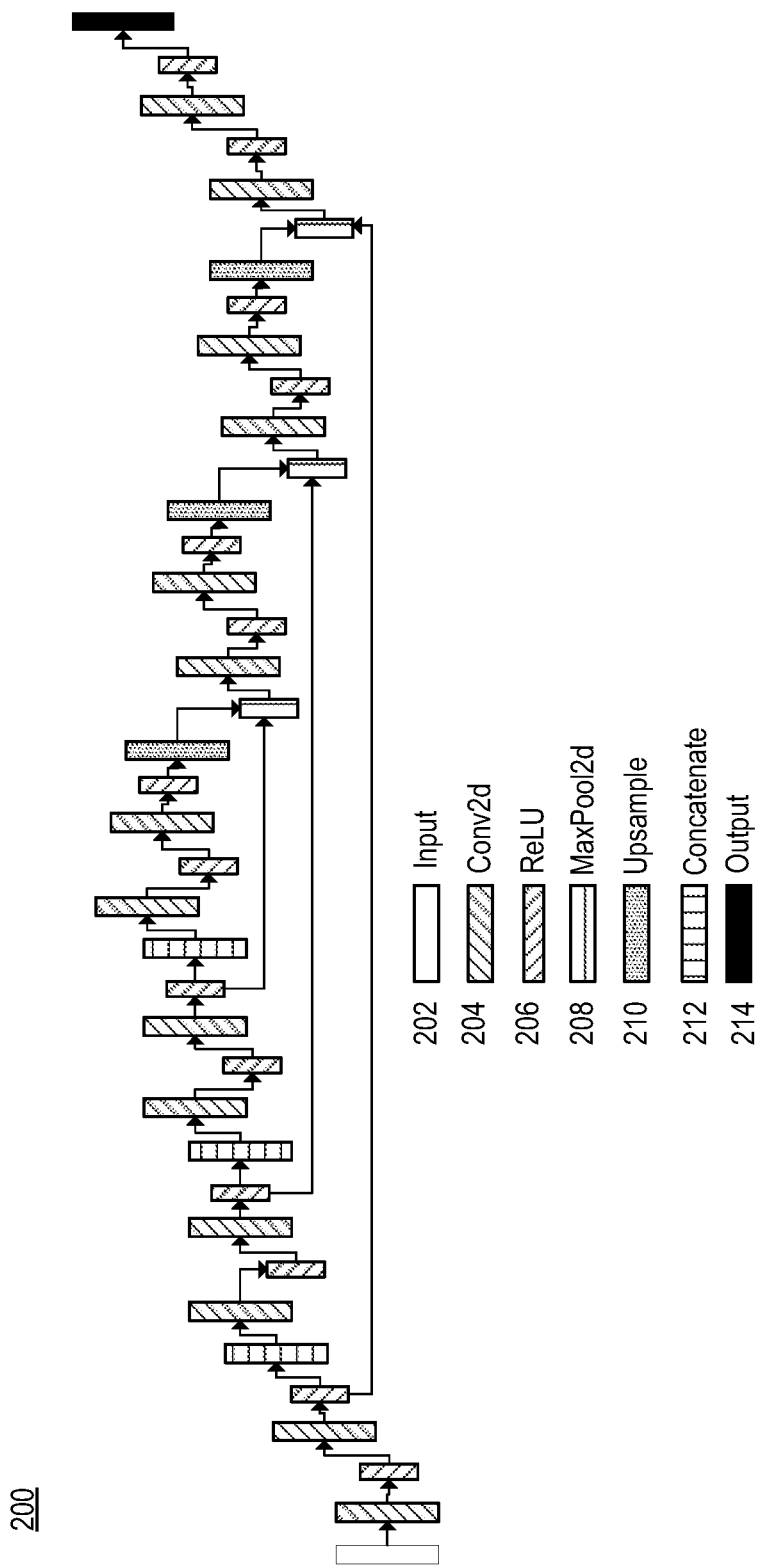
FIG. 2 illustrates an exemplary architecture of deep learning module from the imaging system of FIG. 1, according to example embodiments.

FIG. 2 illustrates an architecture 200 of deep learning model 154, according to example embodiments. As shown, architecture 200 includes an input layer 202, a plurality of convolutional layers 204, a plurality of activation layers 206, a plurality of max pooling layers 208, a plurality of upsampling layers 210, a plurality of concatenating layers 212, and an output layer 214. In some embodiments, input layer 202 may have dimensions of 6×1200×1200. In some embodiments, output layer 214 may have dimensions 1×1200×1200.

Figure 3:
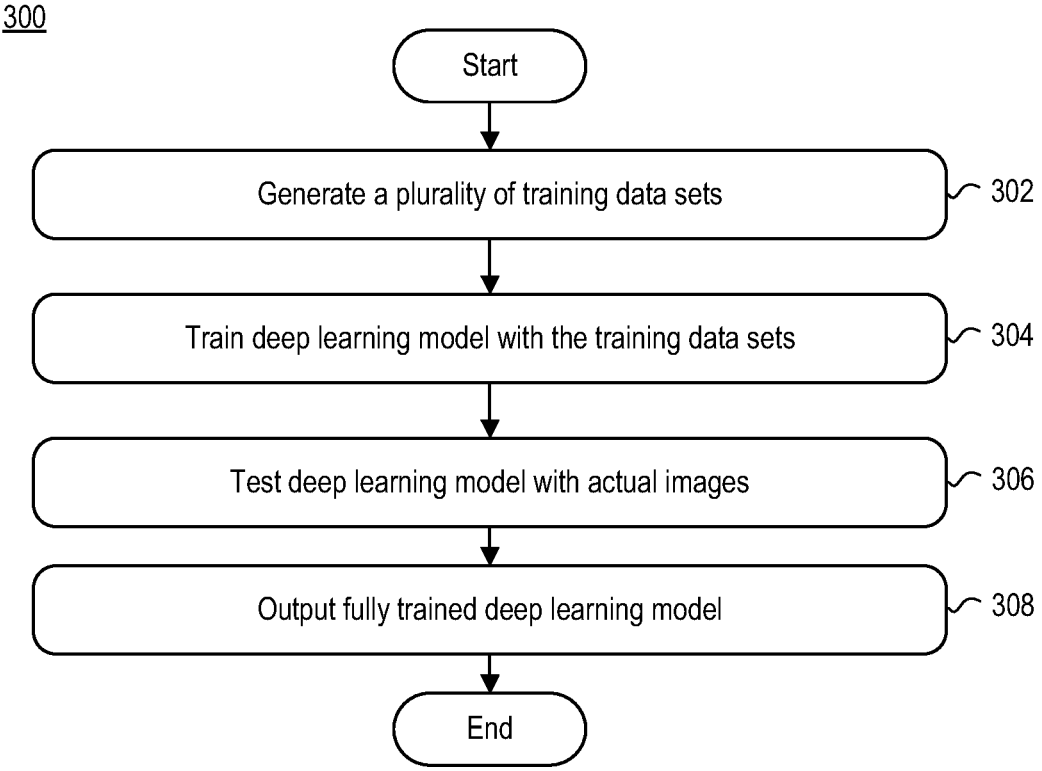
FIG. 3 is a flow diagram illustrating a method of training deep learning module, according to example embodiments.

FIG. 3 is a flow diagram illustrating a method 300 of training deep learning model 154, according to example embodiments. Method 300 may begin at step 302.

At step 302, computing system 150 may generate a plurality of training data sets. For example, pre-processing engine 152 may create one or more synthetic height maps by randomly placing a plurality (e.g., 100) non-overlapping half-spheres on a blank height map. In some embodiments, half-spheres with radius uniformly ranging from between about four to about twenty pixels may be added as bumps in the positive direction and holes in the negative direction (e.g., or vice versa) with height represented as a 32 bit pixel value. In some embodiments, pre-processing engine 152 may further convert each height map procedurally to a 3D shape using one or more modeling and rendering packages. In some embodiments, pre-processing engine 152 may calculate a position of a "point" light source for a plurality of illumination light vectors (e.g., eight illumination light vectors). For each light vector, a monochrome 16-bit image may be rendered using a ray-tracing engine (e.g., Cycles ray-tracing engine).

At step 304, computing system 150 may train deep learning model 154 with the plurality of training data sets. For example, computing system 150 may train deep learning model 154 to generate a height map based on the plurality of training data sets. In some embodiments, computing system 150 may further train deep learning model 154 with real data (e.g., actual images).

At step 306, computing system 150 may test deep learning model 154 with actual images. For example, instead of synthetic inputs, computing system 150 may test deep learning model 154 using actual microscopic images of rubber surfaces. In some embodiments, a plurality (e.g., 6) images may be taken of each sample with a fixed camera angle and varying illumination directions. Unlike synthetic data with precisely known ground truth, ground truth height measurements on the rubber samples may be used, At step 308, computing system 150 may output a fully trained deep learning model 154. For example, following the training and testing operations, deep learning model 154 may be fully trained for use with apparatus 102 or other similar apparatuses.

Figure 4A:
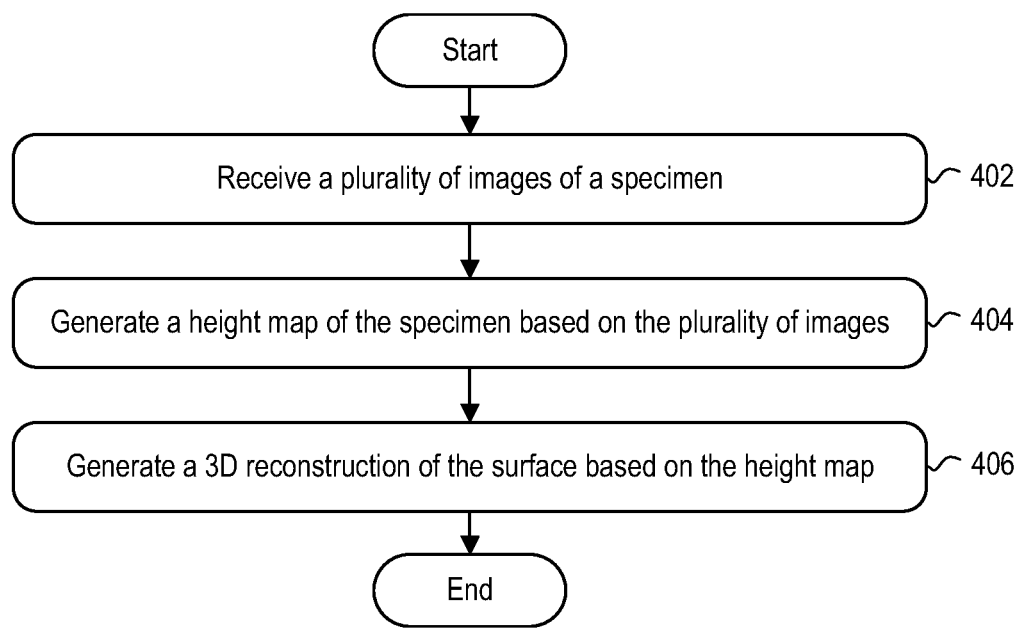
FIG. 4A is a flow diagram illustrating a method of generating a 3D-reconstruction of a specimen, according to example embodiments.

FIG. 4A is a flow diagram illustrating a method 400 of generating a 3D-reconstruction of a microscopic surface, according to example embodiments. Method 400 may begin at step 402.

At step 402, computing system 150 may receive a plurality of images of a specimen. For example, one or more light sources 104, 106 of apparatus 102 may direct oblique light 108, 110 toward specimen 101 at various angles. Camera device 114 of apparatus 102 may capture the reflected light. In some embodiments, light sources 104, 106 may be moved to different positions located circumferentially around the object, with images taken at each position. Each of these images may be provided to computing system 150 for further processing.

At step 404, computing system 150 may be configured to generate a height map of the specimen based on the plurality of images. For example, computing system 150 may provide the plurality of images, as input, to deep learning model 154. Deep learning model 154 may generate, based on the plurality of images, a height map corresponding to the surface of the specimen.

At step 406, computing system 150 may generate a 3D-reconstruction of the microscopic surface based on the output from deep learning model 154. For example, computing system 150 may generate a 3D-reconstruction of the microscopic surfaces based on the height map output from deep learning model 154.

Figure 4B:
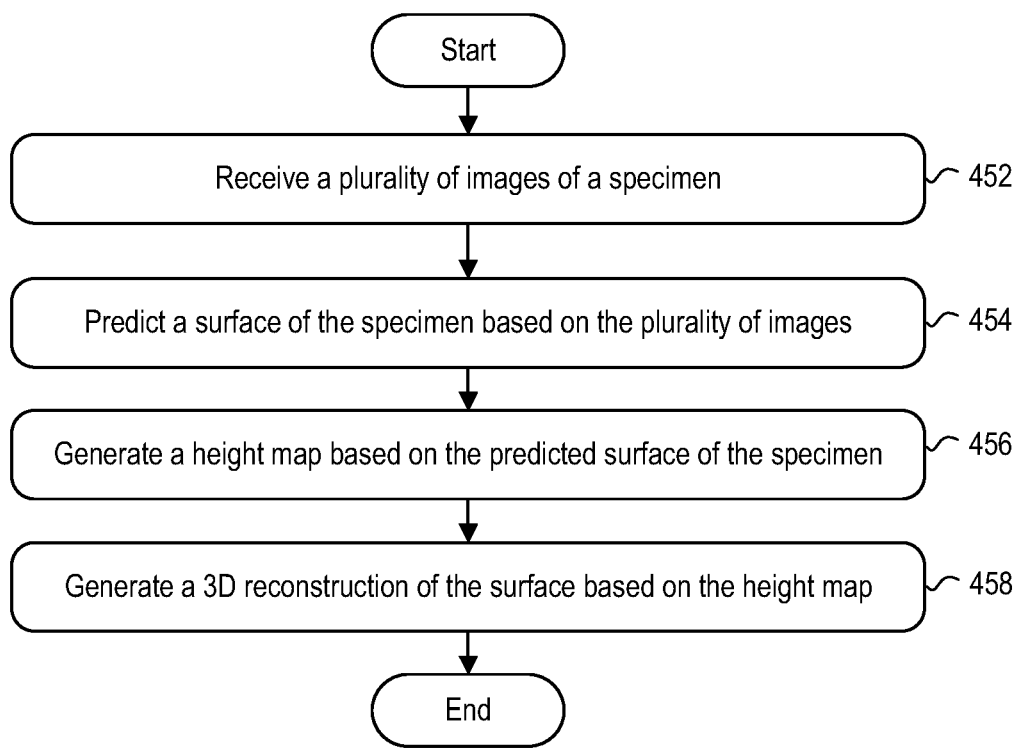
FIG. 4B is a flow diagram illustrating a method of generating a 3D-reconstruction of a microscopic surface, according to example embodiments.

FIG. 4B is a flow diagram illustrating a method 450 of generating a 3D-reconstruction of a microscopic surface, according to example embodiments. Method 450 may begin at step 452.

At step 452, computing system 150 may receive a plurality of images of a specimen. For example, one or more light sources 104, 106 of apparatus 102 may direct oblique light 108, 110 toward specimen 101 at various angles. Camera device 114 of apparatus 102 may capture the reflected light. In some embodiments, light sources 104, 106 may be moved to different positions located circumferentially around the object, with images taken at each position. Each of these images may be provided to computing system 150 for further processing.

At step 454, computing system 150 may be configured to generate a surface prediction of the specimen based on the plurality of images. For example, computing system 150 may provide the plurality of images, as input, to deep learning model 154. Deep learning model 154 may generate, based on the plurality of images, a surface prediction of the specimen.

At step 456, computing system 150 may generate a height map based on the predicted surface of the specimen. For example, integration engine 156 may integrate the surface normal of the 3D-reconstruction to generate the height map, as discussed above.

At step 458, computing system 150 may generate a 3D-reconstruction of the microscopic surface based on the output from deep learning model 154. For example, computing system 150 may generate a 3D-reconstruction of the microscopic surfaces based on the height map output from deep learning model 154.

Figure 5:
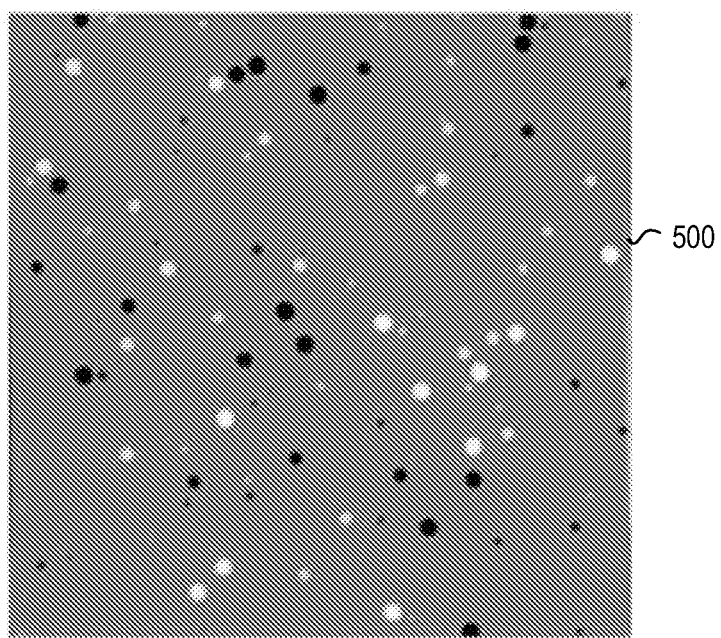
FIG. 5 illustrates an exemplary 3D-reconstruction of a specimen, according to example embodiments.

FIG. 5 illustrates an exemplary 3D-reconstruction 500 of a specimen, according to example embodiments. As provided above, 3D-reconstruction 500 may be an exemplary output from computing environment 100 following analysis by deep learning model 154.

FIG. 6A illustrates a system bus computing system architecture 600, according to example embodiments. One or more components of system 600 may be in electrical communication with each other using a bus 605. System 600 may include a processor (e.g., one or more CPUs, GPUs or other types of processors) 610 and a system bus 605 that couples various system components including the system memory 615, such as read only memory (ROM) 620 and random access memory (RAM) 625, to processor 610. System 600 can include a cache of high-speed memory connected directly with, in close proximity to, or integrated as part of processor 610. System 600 can copy data from memory 615 and/or storage device 630 to cache 612 for quick access by processor 610. In this way, cache 612 may provide a performance boost that avoids processor 610 delays while waiting for data. These and other modules can control or be configured to control processor 610 to perform various actions. Other system memory 615 may be available for use as well. Memory 615 may include multiple different types of memory with different performance characteristics. Processor 610 may be representative of a single processor or multiple processors. Processor 610 can include one or more of a general purpose processor or a hardware module or software module, such as service 1 632, service 2 634, and service 3 636 stored in storage device 630, configured to control processor 610, as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction with the computing device 600, an input device 645 which can be any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with computing device 600. Communications interface 640 can generally govern and manage the user input and system output. There is no restriction on operating on any particular hardware arrangement and therefore the basic features here may easily be substituted for improved hardware or firmware arrangements as they are developed.

Storage device 630 may be a non-volatile memory and can be a hard disk or other types of computer readable media that can store data that are accessible by a computer, such as magnetic cassettes, flash memory cards, solid state memory devices, digital versatile disks, cartridges, random access memories (RAMs) 625, read only memory (ROM) 620, and hybrids thereof Storage device 630 can include services 632, 634, and 636 for controlling the processor 610. Other hardware or software modules are contemplated. Storage device 630 can be connected to system bus 605. In one aspect, a hardware module that performs a particular function can include the software component stored in a computer-readable medium in connection with the necessary hardware components, such as processor 610, bus 605, display 635, and so forth, to carry out the function.

FIG. 6B illustrates a computer system 650 having a chipset architecture, according to example embodiments. Computer system 650 may be an example of computer hardware, software, and firmware that can be used to implement the disclosed technology. System 650 can include one or more processors 655, representative of any number of physically and/or logically distinct resources capable of executing software, firmware, and hardware configured to perform identified computations. One or more processors 655 can communicate with a chipset 660 that can control input to and output from one or more processors 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 655 analyzing data stored in storage 670 or 675. Further, the machine can receive inputs from a user through user interface components 685 and execute appropriate functions, such as browsing functions by interpreting these inputs using one or more processors 655.

It can be appreciated that example systems 600 and 650 can have more than one processor 610 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. An imaging system, comprising:
   an imaging apparatus comprising a plurality of light sources positioned at a plurality of positions and a plurality of angles relative to a stage configured to support a substrate, wherein the imaging apparatus is configured to capture a plurality of images of a microscopic surface of the substrate; and a computing system in communication with the imaging apparatus, the computing system configured to generate a 3D-reconstruction of the microscopic surface of the substrate by:
receiving, from the imaging apparatus, the plurality of images of the microscopic surface of the substrate;
generating, by a deep learning model, a prediction of a local surface of the substrate based on the plurality of images;
generating, by the deep learning model, a height map of the microscopic surface of the substrate based on the prediction of the local surface; and
generating the 3D-reconstruction of the microscopic surface of the substrate based on the height map generated by the deep learning model;
wherein the deep learning model comprises at least one upsampling layer that directly feeds into a max pooling layer.

2. The imaging system of claim 1, wherein the deep learning model comprises a convolutional neural network.

3. The imaging system of claim 2, wherein the convolutional neural network is configured to receive, as input, the plurality of images and output a single image.

4. The imaging system of claim 1, wherein generating the height map based on the prediction comprises:
integrating a surface normal of the substrate to generate the height map.

5. The imaging system of claim 1, further comprising:
training the deep learning model to generate the height map based on variations in noise and tilt.

6. A method of generating a 3D-reconstruction of a microscopic surface of a substrate, comprising:
receiving, by a computing system from an imaging apparatus, a plurality of images of a microscopic surface of a substrate, the plurality of images comprising images taken using plurality of light sources positioned at a plurality of positions and a plurality of angles relative to a stage configured to support the substrate;
generating, by a deep learning model, a prediction of a local surface of the substrate based on the plurality of images;
generating, by the deep learning model of the computing system, a height map of the microscopic surface of the substrate based on the prediction of the local surface; and
generating, by the computing system, a 3D-reconstruction of the microscopic surface of the substrate based on the height map generated by the deep learning model;
wherein the deep learning model comprises at least one upsampling layer that directly feeds into a max pooling layer.

7. The method of claim 6, wherein the deep learning model comprises a convolutional neural network.

8. The method of claim 7, wherein the convolutional neural network is configured to receive, as input, the plurality of images and output a single image.

9. The method of claim 6, wherein generating the height map based on the prediction comprises:
integrating a surface normal of the substrate to generate the height map.

10. The method of claim 6, further comprising:
training the deep learning model to generate the height map based on variations in noise and tilt.

11. A non-transitory computer readable medium comprising one or more sequences of instructions, which, when executed by one or more processors, cause a computing system to perform operations, comprising:
receiving, by the computing system from an imaging apparatus, a plurality of images of a microscopic surface of a substrate, the plurality of images comprising images taken using plurality of light sources positioned at a plurality of positions and a plurality of angles relative to a stage configured to support the substrate;
generating, by a deep learning model, a prediction of a local surface of the substrate based on the plurality of images;
generating, by the deep learning model of the computing system, a height map of the microscopic surface of the substrate based on the prediction of the local surface; and
generating, by the computing system, a 3D-reconstruction of the microscopic surface of the substrate based on the height map generated by the deep learning model;
wherein the deep learning model comprises at least one upsampling layer that directly feeds into a max pooling layer.

12. The non-transitory computer readable medium of claim 11, wherein the deep learning model comprises a convolutional neural network configured to receive, as input, the plurality of images and output a single image.

13. The non-transitory computer readable medium of claim 11, wherein generating the height map based on the prediction comprises:
integrating a surface normal of the substrate to generate the height map.

14. The non-transitory computer readable medium of claim 11, further comprising:
training the deep learning model to generate the height map based on variations in noise and tilt.

* * * * *